Patented Nov. 13, 1928.

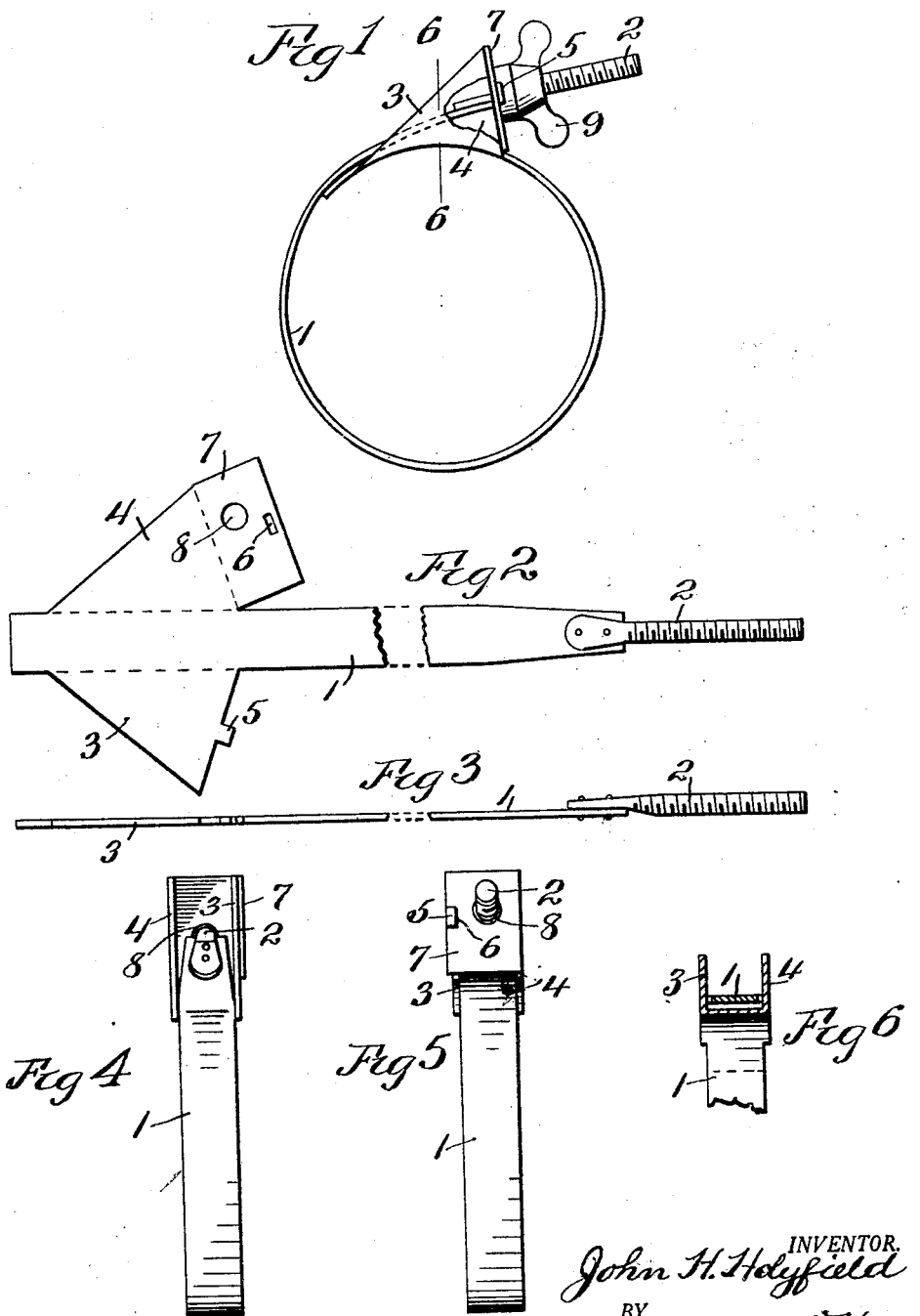

1,691,288

UNITED STATES PATENT OFFICE.

JOHN H. HOLYFIELD, OF KANSAS CITY, KANSAS.

HOSE CLAMP.

Application filed February 13, 1928. Serial No. 253,967.

My invention relates to improvements in hose clamps. One of its objects is to provide a novel hose clamp, which is simple, cheap, strong, durable, not liable to get out of order, which is readily adaptable to hose of different diameters, which will tightly clamp the hose without injury thereto, and which can be easily and quickly mounted in or removed from its operative position.

The novel features of my invention are hereinafter fully described and claimed.

In the accompanying drawing, which illustrates the preferred embodiment of my invention.

Fig. 1 is a side elevation, partly broken away, of my improved hose clamp, shown formed into its operative position.

Fig. 2 is a plan view, partly broken away, of the strap prior to the flanges thereof being formed into their operative positions.

Fig. 3 is an edge view of the same.

Fig. 4 is an elevation of the parts as shown in Fig. 1, looking in one direction.

Fig. 5 is a view similar to Fig. 4, looking in the opposite direction, with the nut removed.

Fig. 6 is a section on the line 6—6 of Fig. 1.

Similar reference characters designate similar parts in the different views.

1 designates the body of the strap, which may be of suitable pliable material, such as sheet steel, brass, aluminum, or other pliable metal. The body 1 at one end has fastened to it a longitudinal screw 2. The body 1 adjacent to the other end portion has two longitudinal oppositely disposed edge flanges 3 and 4, the flange 3 having at one end a projection 5 adapted to enter a hole 6 in a transverse flange 7, which is integral with the flange 4, and which has through it, between the flanges 3 and 4 a hole 8 adapted to receive therethrough the screw 2, when the strap is formed into a ring, as shown in Figs. 1, 4 and 5.

9 is a thumb nut adapted to be mounted on the screw 2 and to bear against the transverse flange 7, when the clamp is mounted on a hose.

The hole 8 is in substantial tangential alinement with the periphery of the ring, and the flange 7 is substantially at right angles to the tangent passing therethrough.

In the making of the body 1, it may be punched from sheet metal in the form shown in Fig. 2, after which the side flanges 3 and 4 may be formed at right angles to the body 1, following which the flange portion 7 is bent at right angles to the flange portion 4, after which the projection 5 is passed through the hole 6 and then bent at right angles against the outer side of the flange 7, thus holding the latter in its operative position.

To the opposite end of the body 1 is fastened in any suitable manner the flattened head of the screw 2, the latter being disposed longitudinally with relation to and in the same plane as the body 1, when the latter is in the flat condition. By having the screw 2 fastened rigidly, as by riveting, as shown, and extended in the same plane as the body 1, there is no liability of the detachment and loss of the screw, and it enables the clamp to be applied easily.

In applying the clamp to a hose, it is made to encircle the hose, not shown, and the screw 2 is passed through the hole 8, after which the nut 9 is mounted on the screw and turned so as to bear tightly against the flange 7, the latter, with the flanges 3 and 4 serving as an abutment, against which the screw bears when the clamp is drawn tightly against and compresses the hose. The end portions of the clamp, in the clamping position, overlap each other, so that there is no liability of the clamp cutting or injuring otherwise the hose.

As shown in Fig. 6, the hole 8 through which the screw 2 passes may be slightly larger in diameter than the screw, to enable the ring to be contracted and expanded to different diameters without kinking.

I do not limit my invention to the structure shown and described, as modifications, within the scope of the appended claims, may be made without departing from the spirit of my invention.

What I claim is:—

1. A hose clamp comprising a pliable strap having at opposite longitudinal edges respectively two longitudinal outwardly extending flanges, one having an end projection, and a transverse flange connecting with the other longitudinal flange and having a hole through which said end projection extends and is bent over said transverse flange, the latter having therethrough a hole disposed between said longitudinal flanges, the other end of said strap having a screw adapted for insertion through the hole in the transverse flange, and a nut on said screw adapted to bear against said transverse flange.

2. A hose clamp comprising a strap having a flat pliable body portion adapted to be circularly formed, said strap adjacent to one end having a transverse abutment at its outer side having a hole therethrough in a line tangential to the body, when the latter is circularly formed, the strap at the other end of the body having a screw extending longitudinally from and in the longitudinal plane of the body and being rigidly fastened to the body, and a nut on said screw adapted to bear against said abutment.

In testimony whereof I have signed my name to this specification.

JOHN H. HOLYFIELD.